(12) United States Patent
Prasetya

(10) Patent No.: US 9,864,740 B2
(45) Date of Patent: Jan. 9, 2018

(54) METHODS AND SYSTEMS FOR CREATING AND APPLYING A TEMPLATE DRIVEN ELEMENT ADAPTER

(71) Applicant: Ciena Corporation, Hanover, MD (US)

(72) Inventor: Eko Prasetya, Petaluma, CA (US)

(73) Assignee: Ciena Corporation, Hanover, MD (US)

( * ) Notice: Subject to any disclaimer, the term of this patent is extended or adjusted under 35 U.S.C. 154(b) by 393 days.

(21) Appl. No.: 14/614,877

(22) Filed: Feb. 5, 2015

(65) Prior Publication Data

US 2016/0234074 A1    Aug. 11, 2016

(51) Int. Cl.
| | | |
|---|---|---|
| *G06F 17/27* | (2006.01) | |
| *G06F 17/30* | (2006.01) | |
| *H04L 12/24* | (2006.01) | |
| *H04L 29/08* | (2006.01) | |

(52) U.S. Cl.
CPC .... *G06F 17/2705* (2013.01); *G06F 17/30327* (2013.01); *H04L 41/022* (2013.01); *H04L 41/0226* (2013.01); *H04L 41/0843* (2013.01); *H04L 67/10* (2013.01)

(58) Field of Classification Search
USPC ........... 798/223; 709/223; 707/758; 348/284
See application file for complete search history.

(56) References Cited

U.S. PATENT DOCUMENTS

| | | | | |
|---|---|---|---|---|
| 4,267,562 A * | 5/1981 | Raimondi | ................. | F41G 3/02 348/144 |
| 2008/0220775 A1* | 9/2008 | Tischer | .................. | H04L 12/66 455/435.1 |
| 2008/0301135 A1* | 12/2008 | Alves | ................ | G06F 17/30442 |
| 2012/0236716 A1* | 9/2012 | Anbazhagan | ....... | H04L 41/5022 370/235 |
| 2012/0314129 A1* | 12/2012 | Mertens | .................. | G11B 27/11 348/474 |
| 2012/0328252 A1* | 12/2012 | Howell | ................ | G02B 6/2555 385/98 |
| 2013/0097194 A1* | 4/2013 | Braga | ............... | G06F 17/30256 707/758 |
| 2014/0176661 A1* | 6/2014 | Smurro | ................... | G06T 9/001 348/14.06 |
| 2015/0045928 A1* | 2/2015 | Perez | .................... | B29C 64/112 700/110 |

\* cited by examiner

*Primary Examiner* — Tammy Nguyen

(74) *Attorney, Agent, or Firm* — Clements Bernard Walker PLLC; Christopher L. Bernard; Lawrence A. Baratta, Jr.

(57) ABSTRACT

Various examples of methods and systems for template driven element adapter are described. In one implementation, one or more processors of a computing device may interface between a user and a networked device of a network of a plurality of networked devices to render a communication between the user and the networked device. The one or more processors may process the communication between the user and the networked device by: transforming data contained in the communication; filtering the communication; and performing one or more of the following: aggregating additional data with the communication; translating the communication; and constructing a second structure for the data in the communication using a template based on a first structure of the data in the communication.

18 Claims, 7 Drawing Sheets

METHODS AND SYSTEMS FOR CREATING AND APPLYING A TEMPLATE DRIVEN ELEMENT ADAPTER

TECHNICAL FIELD

The present disclosure relates to methods and systems for creating and applying a template driven element adapter.

BACKGROUND

Wide area networks typically include multiple independent network layers each including various networked devices of different functions, types, families and vendors. Historically, each of these layers has been operated independently using separate, vendor-specific management systems with no awareness of adjacent layers or network resources. The resulting complexity leads to operational inefficiencies, such as poor overall network utilization, configuration errors, delayed resolution of issues, and ultimately, to higher costs.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1:
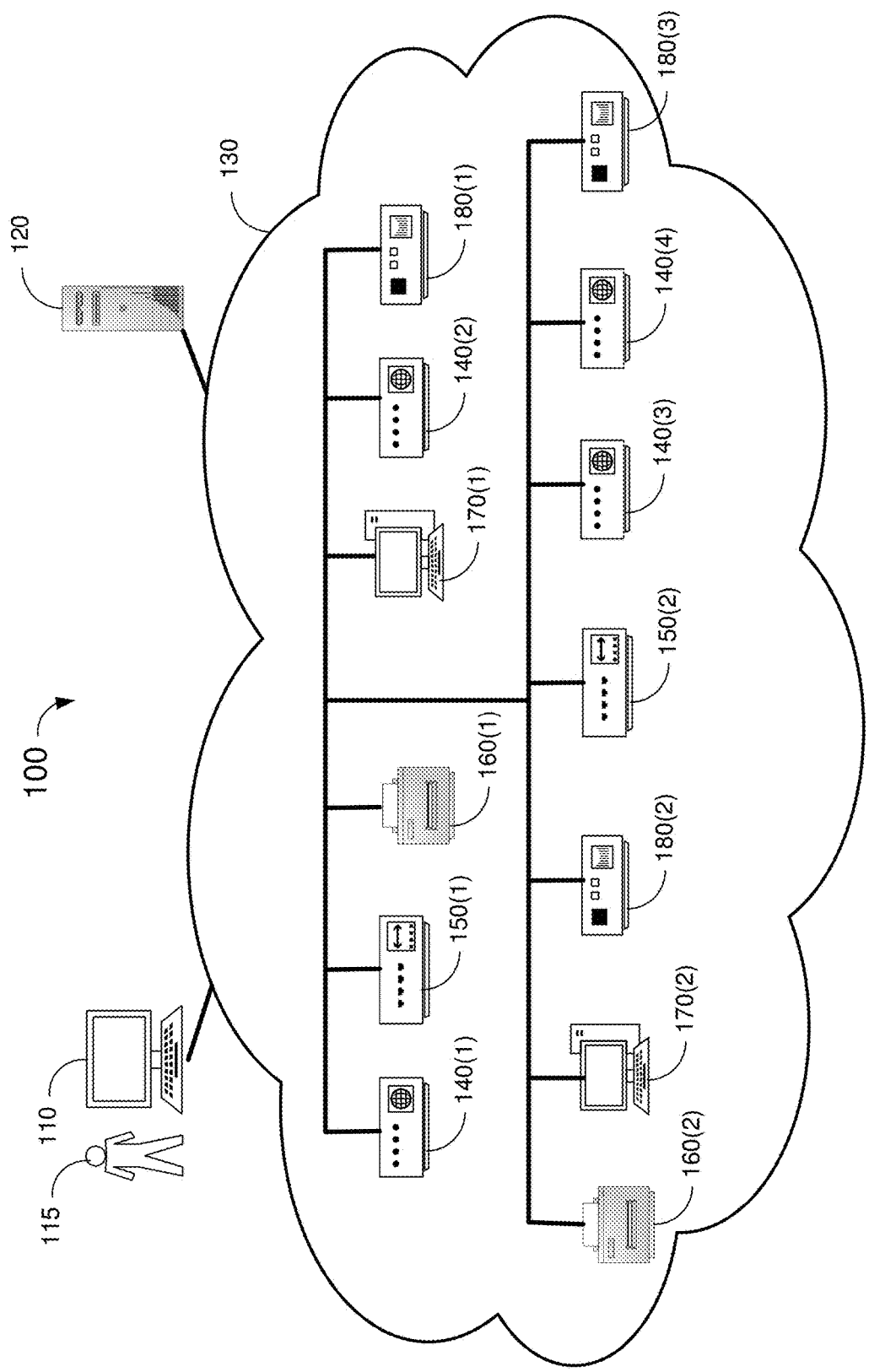
FIG. 1 is a diagram depicting an example network environment within which an embodiment of a template driven element adapter in accordance with the present disclosure may be implemented.

In the following description, reference is made to the accompanying drawings that form a part thereof, and in which is shown by way of illustrating specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

The articles "a" and "an" are used herein to refer to one or to more than one (i.e. to at least one) of the grammatical object of the article. By way of example, "a user" means one user or more than one users. Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

Embodiments of the present disclosure may be implemented as carrier software defined network (SDN) applications providing end-to-end fault, configuration, accounting, provisioning, and security (FCAPS) management, which can dramatically simplify the operation of multi-vendor, multi-layer networks. Moreover, users, such as network administrators, developers and engineers, are enabled to develop and extend element adapters with template driven element adapter in accordance with embodiments of the present disclosure.

In view of the challenges associated with managing and operating a network of various networked devices that are of different functions, types, families and vendors, the present disclosure provides a template driven element adapter (TDEA) to avoid or at least minimize the complexity in managing and operating the various networked devices. In developing a TDEA, a number of factors need to be considered. Firstly, the communication protocol required to communicate with each networked device needs to be identified. Secondly, the set of commands that need to be sent to the networked device in order to perform create, read, update and delete (CRUD) operations needs to be identified. Thirdly, the input and output of the CRUD operations as well as the proper parsing thereof need to be understood. Additionally, the way to properly transform data from a networked device to a common structure that is expected by an application needs to be known. There are sets of operations or methods that apply well across all element adapters, regardless of the device types or device families. Embodiments of the TDEA in accordance with the present disclosure are designed to capture the commonalities among the sets of operations and methods that apply well across all element adapters, and create reusable components across element adapters.

In some embodiments, structures that reside and that are exchanged within the TDEA may be in the form of JavaScript Object Notation (JSON) structure, as a way to store information in an organized, easy-to-access manner. With JSON structure a given structure may be translated into a platform/language where the structure is currently handled/processed. As an example, with JSON defining an object to be a pair of key and value, the structure may map very well, for example, to Python dictionary. Nevertheless, the key may be constrained to a string. In other embodiments, another pre-existing or future-developed structure or framework in place of JSON may be utilized to implement techniques of the present disclosure.

A number of reasons why JSON may be used include, but are not limited to, the scalability, simplicity and fast speed associated with JSON. In particular, JSON has a wide implementation across many languages/platforms. Having a JSON structure allows the TDEA to interact with many back-end systems regardless of the respective platforms. Additionally, JSON tends to be simple and easy to understand as JSON does not try to cover many things. The limitation of JSON allows developers to build many rules that are hard to implement otherwise. Furthermore, since the JSON standard is simple, it allows a parser to be optimized easily. The parsing of a JSON structure may be much faster than the parsing of more complex structure such as, for example, YAML, XML and HTML.

JSONPath is a generic method to access an object within a JSON structure. It borrows its concepts from XPath to access DOM object within a large DOM structure. Accordingly, in some embodiments, JSONPath may be utilized in the data model of the present disclosure to refer to specific objects within the JSON structure. Besides, the use of JSONPath helps a developer to avoid writing code when there is a need to extract certain fields.

As part of the JSON construction, in some embodiments, JSON schema may be utilized to enforce JSON formats across many modules. The use of JSON schema helps avoid having many boiler plate on data validation. It also provides a mechanism to document how a specific module expects its input parameters.

FIG. 1 is a diagram depicting an example network environment 100 within which an embodiment of a template driven element adapter in accordance with the present disclosure may be implemented. Example network environment 100 may include a user 115 managing the operations of a network 130 via a user device 110, which is communicatively coupled to network 130, and with the aid of embodiments of TDEA in accordance with the present disclosure. In some embodiments, embodiments of TDEA in accordance with the present disclosure may be implemented in a server 120 which is communicatively coupled to user device 110 and network 130. In other embodiments, embodiments of TDEA in accordance with the present disclosure may be implemented in user device 110 or another computing device or apparatus. User device 110 may be a mobile device such as a smartphone, a laptop computer, a notebook computer, a tablet computer, a wearable computer, a desktop computer, a personal data assistant (PDA), an internet appliance, a server or any other computing device configured with a network connection. Server 120 may include one or more servers or any suitable computing device configured with a network connection.

Network 130 may include wired and/or wireless networks that enable communications between the various networked devices associated with example network environment 100. Network 130 may include a variety of different networked devices that are of different types and families. In the example shown in FIG. 1 for illustrative purpose, network 130 includes networked devices 140(1), 140(2), 140(3), 140(4), 150(1), 150(2), 160(1), 160(2), 170(1), 170(2), 180(1), 180(2) and 180(3). In some embodiments, network 130 may include one or more local area networks (LANs), one or more wide area networks (WAN), one or more mobile telephone networks (MTNs), and/or other types of networks, possibly in conjunction with one another, to facilitate communication among the various networked devices (e.g., between user device 110 and one or more of networked devices 140(1), 140(2), 140(3), 140(4), 150(1), 150(2), 160(1), 160(2), 170(1), 170(2), 180(1), 180(2) and 180(3)).

Networked devices 140(1), 140(2), 140(3) and 140(4) may be of the same device family, networked devices 150(1) and 150(2) may be of the same device family, networked devices 160(1) and 160(2) may be of the same device family, networked devices 170(1) and 170(2) may be of the same device family, and networked devices 180(1), 180(2) and 180(3) may be of the same device family. Moreover, among the networked devices of each device family, the networked devices may be of different types and made by different vendors, thus having different device-specific configurations and characteristics. It shall be understood that, although a finite number of networked devices and a finite number of device families/types are shown in network 130, embodiments of the present disclosure are applicable to networks having different numbers of networked devices and different numbers of device families and types.

Figure 2:
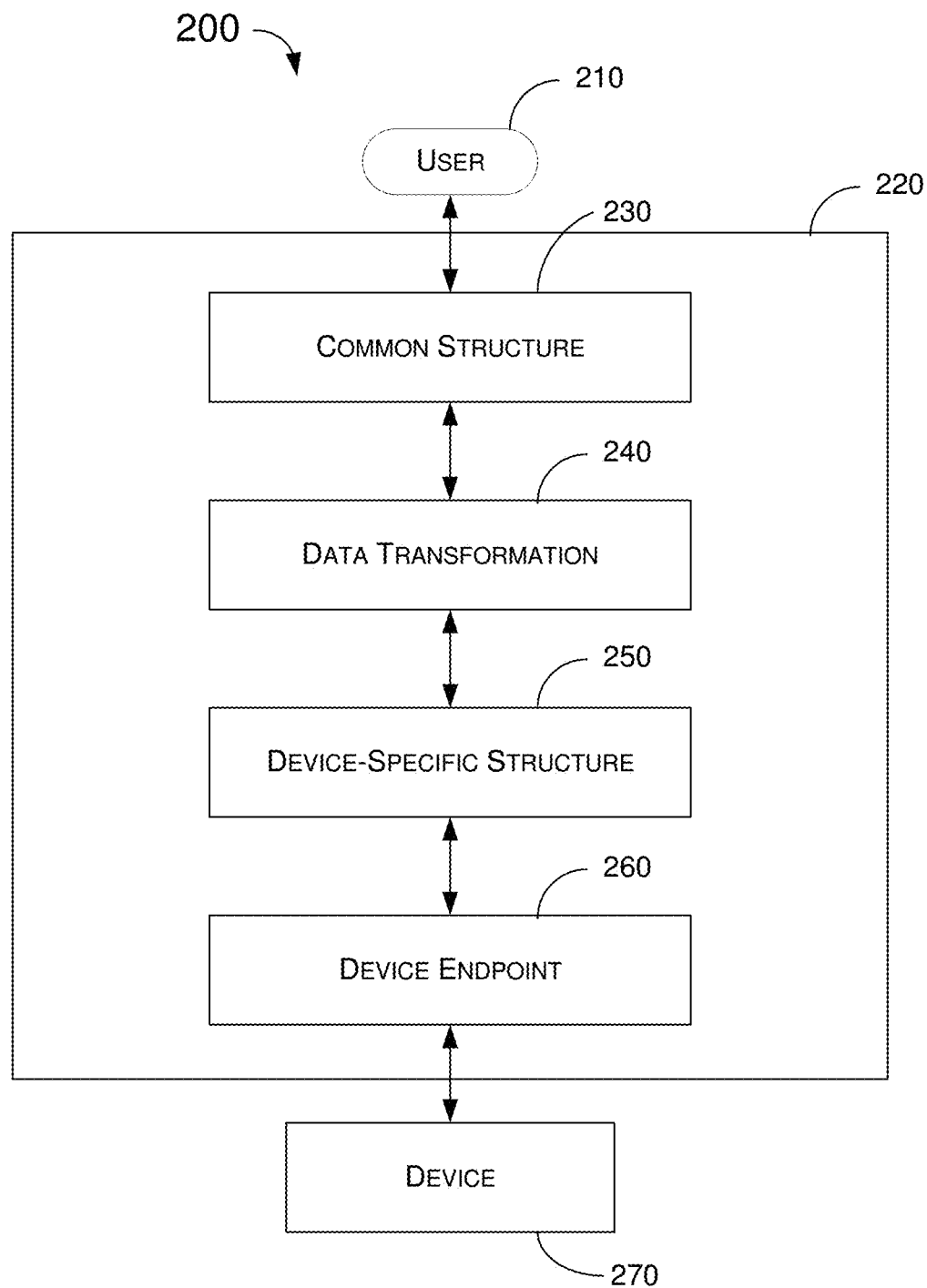
FIG. 2 is a block diagram depicting an example of functional implementation of an example template driven element adapter in accordance with an embodiment of the present disclosure.

FIG. 2 is a block diagram depicting an example of functional implementation 200 of an example TDEA in accordance with an embodiment of the present disclosure. As shown in FIG. 2, an example TDEA 220 is implemented between a user 210, e.g., user 115 via user device 110 of FIG. 1, and a device 270, e.g., any of the networked devices 140(1), 140(2), 140(3), 140(4), 150(1), 150(2), 160(1), 160(2), 170(1), 170(2), 180(1), 180(2) and 180(3) of FIG. 1. Example TDEA 220 may be implemented in and executed by server 120 of FIG. 1. Example TDEA 220 may include a number of functional modules such as, for example, a common structure module 230, a data transformation module 240, a device-specific module 250 and a device endpoint module 260.

Common structure module 230 may contain a number of commands that are common to devices of different device families/types and from different vendors. Data transformation module 240 may transform data from one form to another. Device-specific module 250 may contain a number of commands that are specific to respective devices, device types and device families. Device endpoint module 260 may specify the communication protocol used between example TDEA 220 and a given device, e.g., any of the networked devices 140(1), 140(2), 140(3), 140(4), 150(1), 150(2), 160(1), 160(2), 170(1), 170(2), 180(1), 180(2) and 180(3) of FIG. 1.

In some embodiments, example TDEA 220 may utilize a directory model that has a root directory with a number of sub-directories under the root directory. These sub-directories may include, for example, a commands directory, an errors directory, a finite state machine status (fsms) directory, a provisioning directory and a templates directory. The root directory of this model may require a device.json file and a family.json file. The device.json file may contain device information, e.g., information of all the networked devices 140(1), 140(2), 140(3), 140(4), 150(1), 150(2), 160(1), 160(2), 170(1), 170(2), 180(1), 180(2) and 180(3) of FIG. 1, which may include family-type information, device-specific error handlers, supported versions, etc. The family.json file may contain family-type information. The family-type information may be referred to by each device listed in the device.json file. Having the family-type information enables grouping of certain behaviors, e.g., commands, to avoid duplication of behaviors across many device types.

The commands directory may hold all the command configurations that example TDEA 220 may use to communicate with a given device, e.g., any of the networked devices 140(1), 140(2), 140(3), 140(4), 150(1), 150(2), 160(1), 160(2), 170(1), 170(2), 180(1), 180(2) and 180(3) of FIG. 1. The errors directory may contain the error handlers for each device/device family/device type. A given error handler may be used to perform a number of tasks including, but not limited to: identifying an error when a command is sent to a given device, constructing the proper error-reason, and propagating an error message north-bound. Additionally, a given error handler may reposition the connection state to a normal state, so that subsequent commands may be received. The fsms directory may contain a number of finite state machine (FSM) files. Example TDEA 220 may use the FSM files to parse a command-line interface (CLI) output that comes from the networked devices. The fsms directory may be optional and may be required for CLI endpoints. The provisioning directory may contain a number of auto-commissioning/provisioning rules. A given auto-commissioning rule may be invoked when a certain event occurs, e.g., discovery, device resynchronization, or manual invocation. The templates directory may contain one or more custom templates to construct a document that may be used for a next stage processing. Examples of a custom template may include, for example, multi-line CLI commands, JSON structure, XML structure, etc.

In some embodiments, in the context of example TDEA 220, a given command may be a JSON structure that describes how an action is to be invoked against a networked device through a specific endpoint. The command may also describe how to parse the result or output from the networked device, and translate the result to a common structure that may be sent to a northbound interface. In computer network and computer architecture, a northbound interface of a component refers to an interface of that component that is used to interface with higher-level layers while a southbound interface of a component refers to an interface of that component that is used to interface with lower-level layers. For illustrative purpose, an example command is provided below.

```
{
    "type": "bpprov.runners.simple.Sequence",
    "tests": [
        "commands/tests/show-version.json"
    ],
    "endpoint-parameters": {
        "command": "show version",
        "fsm": "fsms/show-version.fsm"
    },
    "out-path": [
    ],
    "in-path": [{
        "type": "bpprov.translators.list.Flatten"
    }]
}
```

An explanation of each section of the above example command is provided below. In the example command, "type" defines how the command should be executed. For example, Sequence runner may be supported to run each out-path and in-path in sequence. In the example command, "tests" defines a list of JSON test files for this command. There may be multiple test files associated with each command, and each test file may have multiple sets of tests. In the example command, "endpoint-parameters" specifies endpoint-specific parameters. In the example above, the endpoint parameters specify (1) the CLI command that needs to be sent to the device, and (2) the FSM file that describes how to parse the incoming output from the device. In the example command, "out-path" is a sequence of translators that may be applied against the north-bound input. A given sequence translates an original input from the north-bound so that the CLI template file may understand how to translate the parameters into a set of commands. In the example command, "in-path" is a sequence of translators for incoming message lines that example TDEA 220 received upon completion of issuing the example command.

In order to support common commands and device family/type-based commands, common structure module 230 may utilize a commands directory that is constructed to support a model such as the following:

```
commands
    mwr2941 (device-family)
        mwr2941-dc-a (device-type)
```

As an example, when a user, e.g., user 115, runs a specific command, e.g., show-inventory.json, a runner, e.g., executed by server 120, may attempt to find the device-specific JSON file under the device-type directory. If the JSON file is not found in that directly, the runner may check in the parent directory, e.g., device-family, to see if that JSON file is there. In the event that the JSON file is not found in those two directories, the runner may find the JSON file in the commands directory which may contain the common commands.

In some embodiments, a user may have multiple approaches to define commands using example TDEA 220. In general, there may be a few types of commands that a user may use more frequently than others. These types of commands may include, for example, multi-command with no output, single-command with considerable output, and combination of commands. The multi-command-no-output type of command may be used during the provisioning stage where the user may need to provide certain prefix, e.g., configure terminal, and postfix, e.g., commit and end. In this scenario, the user may be concerned with whether an operation is completed successfully or not. The single-command-with-considerable-output type of command may be used to monitor the state of the system. It may require additional parser, e.g., FSM, to identify the output and create meaningful response to the user. The combination-of-commands type of command may be used for a more complex sequence where there is a need of both multi-command and single-command types of commands.

In some embodiments, FSM may be a parser rule that defines how a given data should be dissected and parsed before being sent to the incoming translator path. The result of a FSM parser may be a two-dimensional list. The FSM parser may be applicable for text-based output, e.g., CLI or TL-1. Non-text-based endpoints may require a different parser model. FSM parser file may be specified in the command structure, and may be referred to by a respective command. For illustrative purpose, an example FSM is provided below.

```
Value Value1 (\S+)
Value Value2 (\d+)
Start
  ^Header ${Value1}
  ^Content ${Value2} -> Record
  EOF
```

The above example defines two expected values from a CLI line that looks like the following:

```
Header Data1
Content 12
Header Data2
Content 997
Header Data3
Content 76
```

For every header and content, the example FSM may extract the "string" part of the header, as defined by Value1 in the example FSM (where "\S" represents non-space characters), and also the "number" part of the content, as identified by Value2 in the example FSM (where "\d" represents digit character). Given the above example and the FSM file, the result of the above parsing may be as follows:

```
[
  ["Data1", "12"],
  ["Data2", "997"],
  ["Data3", "76"]
]
```

Figure 3:
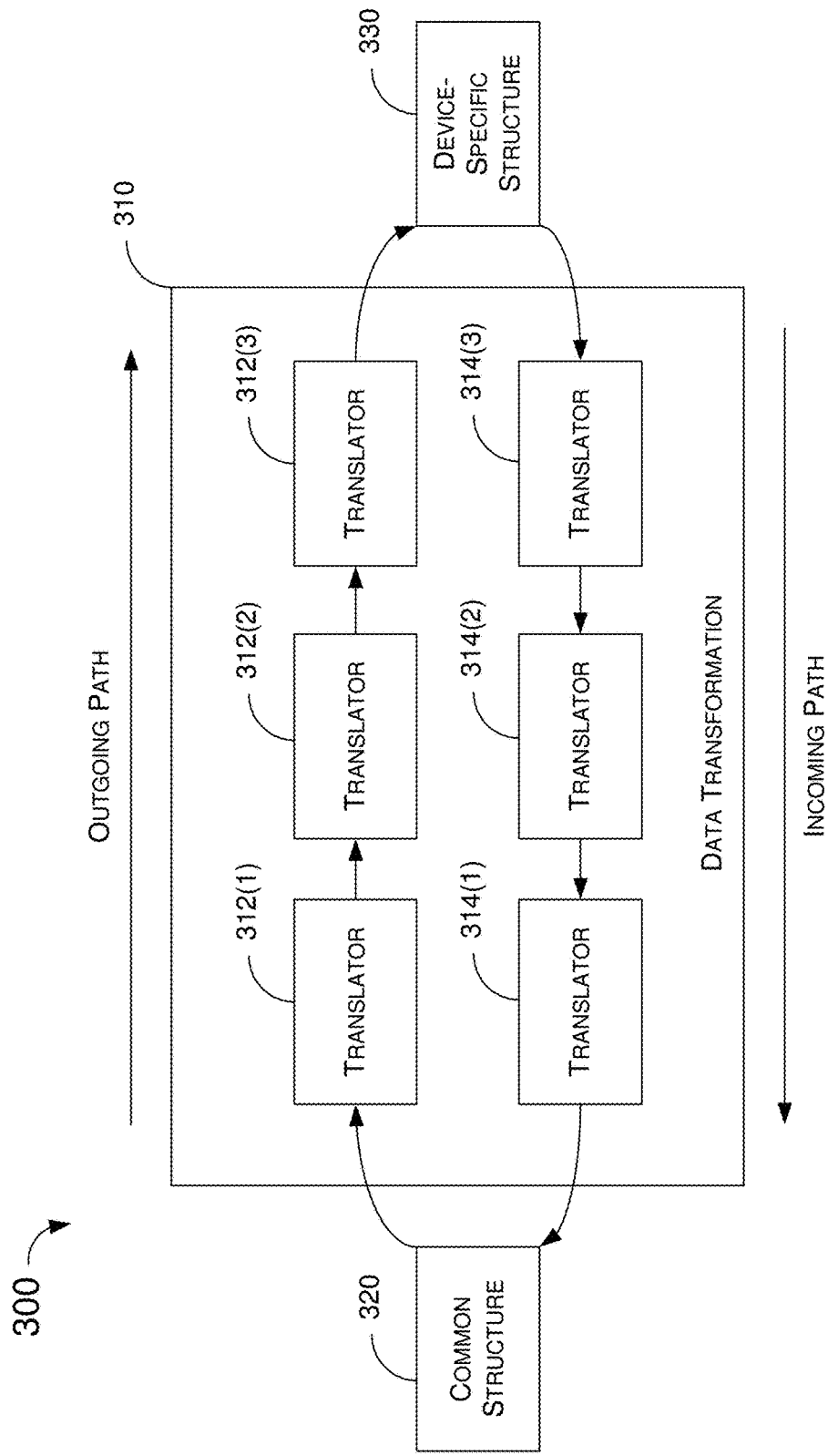
FIG. 3 is a block diagram depicting an example implementation of example data transformation in accordance with an embodiment of the present disclosure.

FIG. 3 is a block diagram depicting an example implementation 300 of an example data transformation in accordance with an embodiment of the present disclosure. In example implementation 300, a data transformation module 310 may be functionally disposed between a common structure module 320 and a device-specific structure module 330. Data transformation module 310, common structure module 320 and device-specific structure module 330 may correspond to and be implemented as data transformation module 240, common structure module 230 and device-specific structure module 250 of example TDEA 220 of FIG. 2, respectively.

As shown in FIG. 3, example data transformation module 310 may include a set of translators such as, for example, translators 312(1), 312(2), 312(3), 314(1), 314(2) and 314(3). Among the translators, translators 312(1), 312(2) and 312(3) may be arranged in a pipeline for translation in the direction of an outgoing path. Similarly, translators 314(1), 314(2) and 314(3) may be arranged in another pipeline for translation in the direction of an incoming path. It shall be understood that, although a finite number of translators are shown in data transformation module 310, data transformation module 310 may have more or fewer translators in various embodiments of the present disclosure.

Translators 312(1), 312(2), 312(3), 314(1), 314(2) and 314(3) may be configured to transform data from one form to another. In some embodiments, translators 312(1), 312(2), 312(3), 314(1), 314(2) and 314(3) may perform a number of functions including, but not limited to, transformation, filtering, aggregation, branching and template construction. Regarding the function of transformation, each of translators 312(1), 312(2), 312(3), 314(1), 314(2) and 314(3) may identify certain data in the JSON structure and replace that data with another value. Regarding the function of filtering, each of translators 312(1), 312(2), 312(3), 314(1), 314(2) and 314(3) may identify certain pattern within the data and determine whether the data should be sent to the next translator in the pipeline. Regarding the function of aggregation, each of translators 312(1), 312(2), 312(3), 314(1), 314(2) and 314(3) may call external commands and, based on the result of the command call, may pick and choose which data to aggregate. Regarding the function of branching, each of translators 312(1), 312(2), 312(3), 314(1), 314(2) and 314(3) may determine whether to run certain translation or skip the translation. Regarding the function of template construction, each of translators 312(1), 312(2), 312(3), 314(1), 314(2) and 314(3) may, in an event of complex structure such as hierarchical tree, use a template engine therein to construct a more arbitrary structure.

In some embodiments, data transformation module 310 may include many small translators each of which is configured to perform specific translation or transformation and applicable to a generic structure. This way, the translators may be re-used for multiple purposes.

Figure 4:
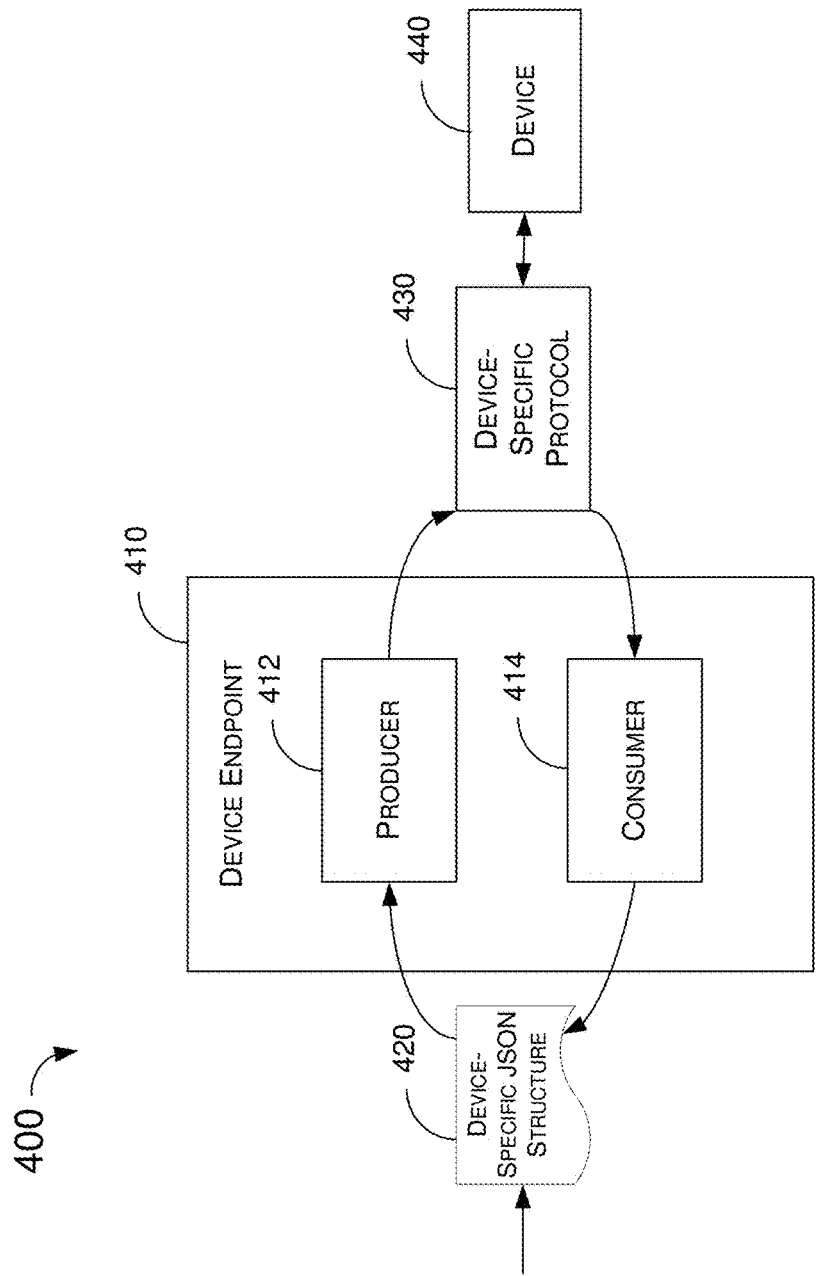
FIG. 4 is a block diagram depicting an example implementation of a device endpoint in accordance with an embodiment of the present disclosure.

FIG. 4 is a block diagram depicting an example implementation 400 of example device endpoint in accordance with an embodiment of the present disclosure. In example implementation 400, a device endpoint module 410 may receive a device-specific JSON structure file 420, e.g., from a device-specific structure module such as device-specific structure 250 of example TDEA 220 of FIG. 2, and communicate to a device 440 using a device-specific protocol 430. Moreover, device endpoint module 410 may communicate with device 440 using device-specific protocol 430 to provide a device-specific JSON structure file, e.g., to a device-specific structure module such as device-specific structure 250 of example TDEA 220 of FIG. 2. Device endpoint module 410 and device 440 may correspond to and be implemented as device endpoint module 260 and device 270 of FIG. 2, respectively.

As shown in FIG. 4, device endpoint module 410 may include a producer 412 and a consumer 414. Producer 412 may be configured to construct a flexible format that allows JSON structure to be translated into a device-specific format for device 440. Consumer 414 may be configured to process and parse data from device 440 into the JSON structure so that it can be processed further by the translators of a data transformation module such as data transformation module 240 and data transformation module 310.

Figure 5:
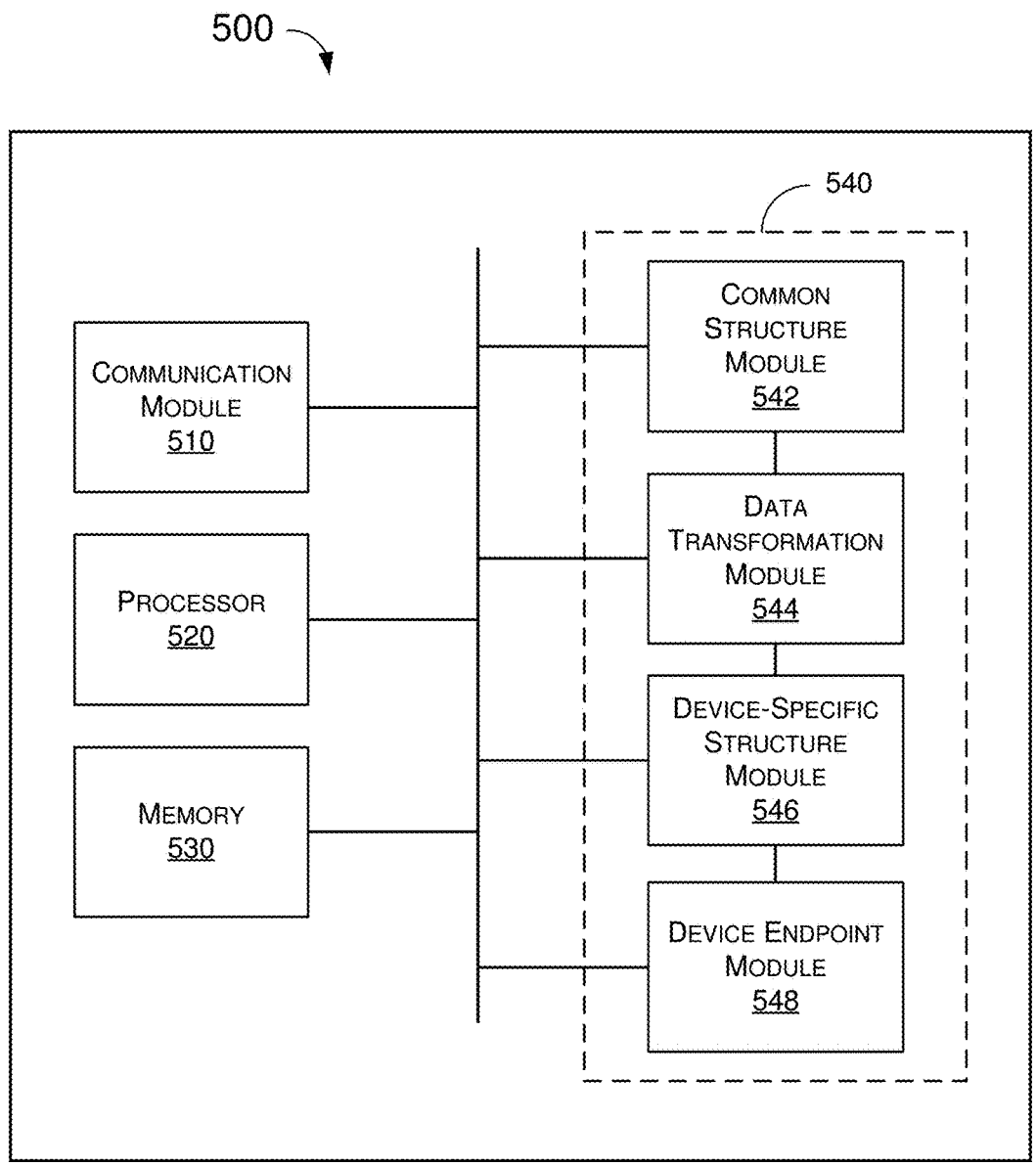
FIG. 5 is a block diagram depicting an embodiment of an apparatus configured to implement a template driven element adapter in accordance with an embodiment of the present disclosure.

FIG. 5 is a block diagram depicting an embodiment of an apparatus 500 configured to implement a template driven element adapter in accordance with an embodiment of the present disclosure. Apparatus 500 may be implemented as server 120 of FIG. 1, and may perform various functions related to template driven element adapter in accordance with the present disclosure. In some embodiments, apparatus 500 may be implemented as one or more computing devices, e.g., server 120, that implement the functions described herein. Apparatus 500 may include a communication module 510, one or more processors (shown as a processor 520 in FIG. 5), and a memory 530. Communication module 510 allows apparatus 500 to communicate with other systems, such as communication networks, and other devices, such as user device 110 and networked devices 140(1), 140(2), 140(3), 140(4), 150(1), 150(2), 160(1), 160(2), 170(1), 170(2), 180(1), 180(2) and 180(3). Processor 520 executes one or more sets of instructions to implement the functionality provided by apparatus 500. Memory 530 stores the one or more sets of instructions executable by processor 520 as well as other data used by processor 520. Apparatus 500 may also include a TDEA 540. TDEA 540 may include a common structure module 542, a data transformation module 544, a device-specific structure module 546 and a device endpoint module 548. Although common structure module 542, data transformation module 544, device-specific structure module 546 and device endpoint module 548 are depicted as discrete modules separate from the processor 504, in various implementations one or more of common structure module 542, data transformation module 544, device-specific structure module 546 and device endpoint module 548 may be implemented in and be integral part of the processor 520.

Common structure module 542 may be configured to interface with the user, the common structure module containing one or more commands at a device level, one or more commands at a device-type level, and one or more commands at a device-family level.

Data transformation module 544 may be communicatively coupled to common structure module 542. Data transformation module 544 may be configured to process a data in a communication between the user and a networked device of a plurality of networked devices, e.g., networked devices 140(1), 140(2), 140(3), 140(4), 150(1), 150(2), 160(1), 160(2), 170(1), 170(2), 180(1), 180(2) and 180(3) of network 130.

Device-specific structure module 546 may be communicatively coupled to data transformation module 544. Device-specific structure 546 may contain one or more device-specific commands specific to the networked device.

Device endpoint module 548 may be communicatively coupled to device-specific structure module 546. Device endpoint module 548 may be configured to interface with one or more networked devices of the plurality of networked devices. Device endpoint module 548 may be also configured to construct a format for the communication that allows a first structure of the data in the communication to be translated for the networked device in an event that the communication is from the user. Device endpoint module 548 may be further configured to parse the data in the communication from a second structure into the first structure in an event that the communication is from the networked device.

In at least some embodiments, the first structure of the data in the communication may be the JSON structure as described herein.

In at least some embodiments, data transformation module 544 may be configured to process the data in the communication by performing a number of operations including: transforming the data in the communication, filtering the communication, optionally aggregating additional data with the communication, optionally translating the communication and optionally constructing a second structure for the data in the communication using a template based on the first structure of the data in the communication. The communication may be, for example, a command from the user to the networked device.

Data transformation module 544 may transform the data in the communication by identifying the data in the communication and replacing a first value of the data with a second value different from the first value. Data transformation module 544 may filter the communication by identifying a pattern within the data in the communication and determining whether or not to send the communication to a subsequent pipeline. Data transformation module 544 may aggregate additional data with the communication by calling one or more external commands if there is additional data, determining whether or not to aggregate the additional data with the communication in response to the calling and, in response to a positive determination, aggregating the additional data with the communication. Data transformation module 544 may translate the communication by determining whether or not to translate the communication and, in response to a determination to translate the communication, translating the communication to a format specific to the networked device. Data transformation module 544 may construct the second structure for the data in the communication by determining whether or not to construct the second structure based on the first structure of the data in the communication and, in response to a determination that the first structure includes a hierarchical tree, constructing the second structure for the data in the communication using the template.

Figure 6:
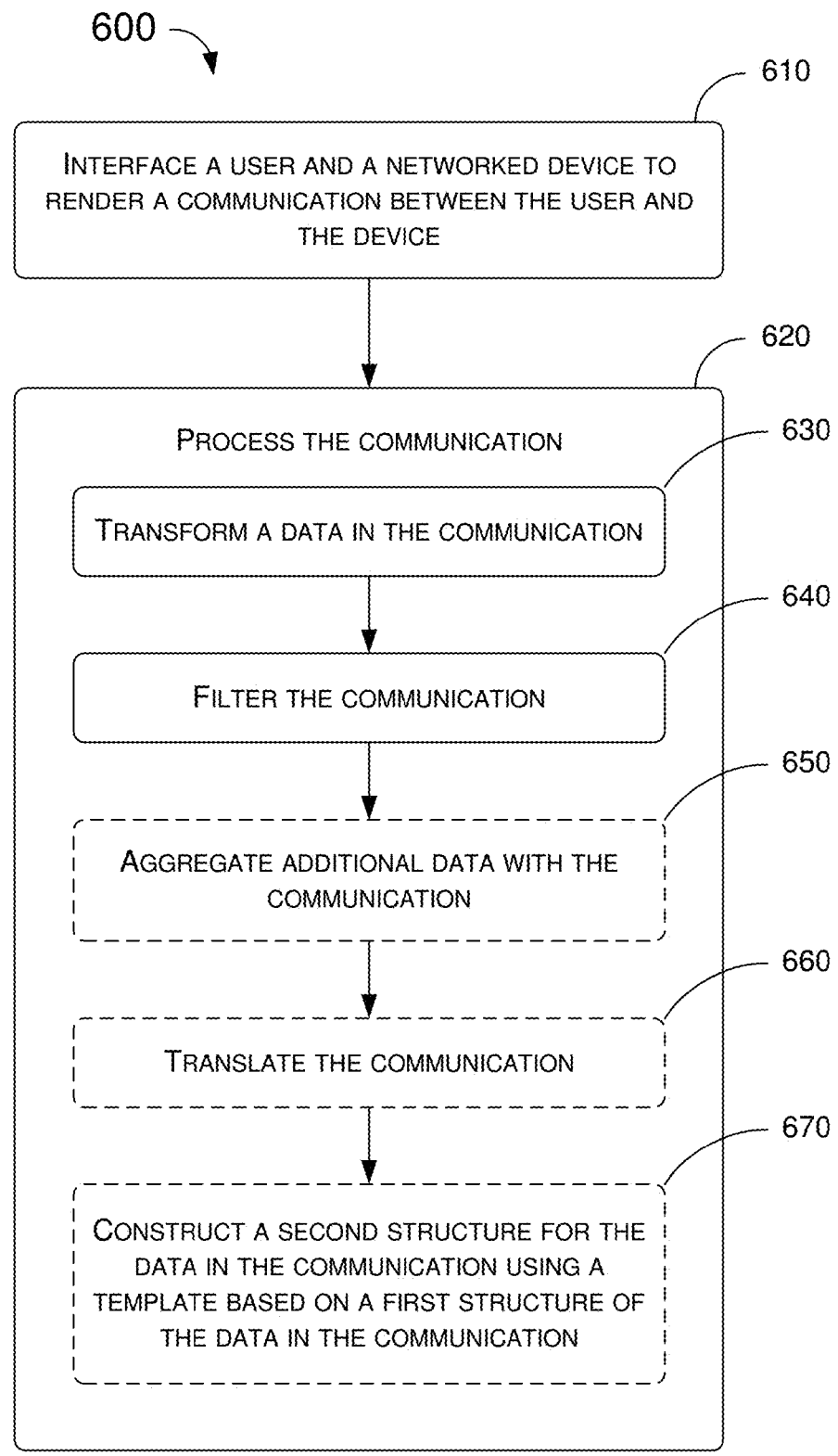
FIG. 6 is a flowchart diagram of an example process related to a template driven element adapter in accordance with an embodiment of the present disclosure.

FIG. 6 is a flowchart diagram of an example process 600 related to a template driven element adapter in accordance with an embodiment of the present disclosure. Example process 600 includes one or more operations, actions, or functions. Although illustrated as discrete blocks, various blocks may be divided into additional blocks, combined into fewer blocks, or eliminated, depending on the desired implementation. Example process 600 may be implemented by one or more processors equipped in, for example, server 120 and apparatus 500. For illustrative purposes, the operations described below are performed by one or more processors of server 120 as shown in FIG. 1 and/or processor 520 of apparatus 500 as shown in FIG. 5.

At 610, one or more processors of server 120 may interface between a user, e.g., user 115 via user device 110, and a networked device of a network of a plurality of networked devices, e.g., any of networked devices 140(1), 140(2), 140(3), 140(4), 150(1), 150(2), 160(1), 160(2), 170(1), 170(2), 180(1), 180(2) and 180(3) of network 130, to render a communication between the user and the networked device. The communication may be, for example, a command from the user to the networked device.

At 620, the one or more processors of server 120 may process the communication between the user and the networked device by performing a number of operations including, but not limited to, 630, 640, 650, 660 and 670. As operations 650, 660 and 670 may be optional and not necessary, they are shown in dashed lines.

At 630, the one or more processors of server 120 may transform data contained in the communication. The term "data" may refer to information contained in the communication, one or more data elements contained in the communication, one or more data packets contained in the communication, or a combination thereof.

At 640, the one or more processors of server 120 may filter the communication.

At 650, the one or more processors of server 120 may optionally aggregate additional data with the communication. That is, the one or more processors of server 120 may call one or more external commands if there is additional data, determine whether or not to aggregate the additional data with the communication in response to the calling and, in response to a positive determination, aggregate the additional data with the communication.

At 660, the one or more processors of server 120 may optionally translate the communication. That is, the one or more processors of server 120 may determine whether or not to translate the communication and, in response to a determination to translate the communication, translate the communication to a format specific to the networked device.

At 670, the one or more processors of server 120 may optionally construct a second structure for the data in the communication using a template based on a first structure of the data in the communication. That is, the one or more processors of server 120 may determine whether or not to construct the second structure based on the first structure of the data in the communication and, in response to a determination that the first structure includes a hierarchical tree, construct the second structure for the data in the communication using the template.

In at least some embodiments, the first structure of the data in the communication may be the JSON structure as described herein.

In at least some embodiments, in transforming the data in the communication, the one or more processors of server 120 may identify the data in the communication, and replace a first value of the data with a second value different from the first value.

In at least some embodiments, in filtering the communication, the one or more processors of server 120 may identify a pattern within the data in the communication, and determine whether or not to send the communication to a subsequent pipeline.

In at least some embodiments, in optionally aggregating additional data with the communication, the one or more processors of server 120 may call one or more external commands, and determine whether or not to aggregate the additional data with the communication in response to the calling.

In at least some embodiments, in optionally translating the communication, the one or more processors of server 120 may determine whether or not to translate the communication and, in response to a determination to translate the communication, translate the communication to a format specific to the networked device.

In at least some embodiments, in optionally constructing a second structure for the data in the communication using a template based on a first structure of the data in the communication, the one or more processors of server 120 may determine whether or not to construct the second structure based on the first structure of the data in the communication and, in response to a determination that the first structure comprises a hierarchical tree, construct the second structure for the data in the communication using the template.

In at least some embodiments, example process 600 may also involve the one or more processors of server 120 constructing a format for the communication that allows the first structure to be translated for the networked device in an event that the communication is from the user.

In at least some embodiments, example process 600 may also involve the one or more processors of server 120 parsing the data in the communication into the first structure in an event that the communication is from the networked device.

Figure 7:
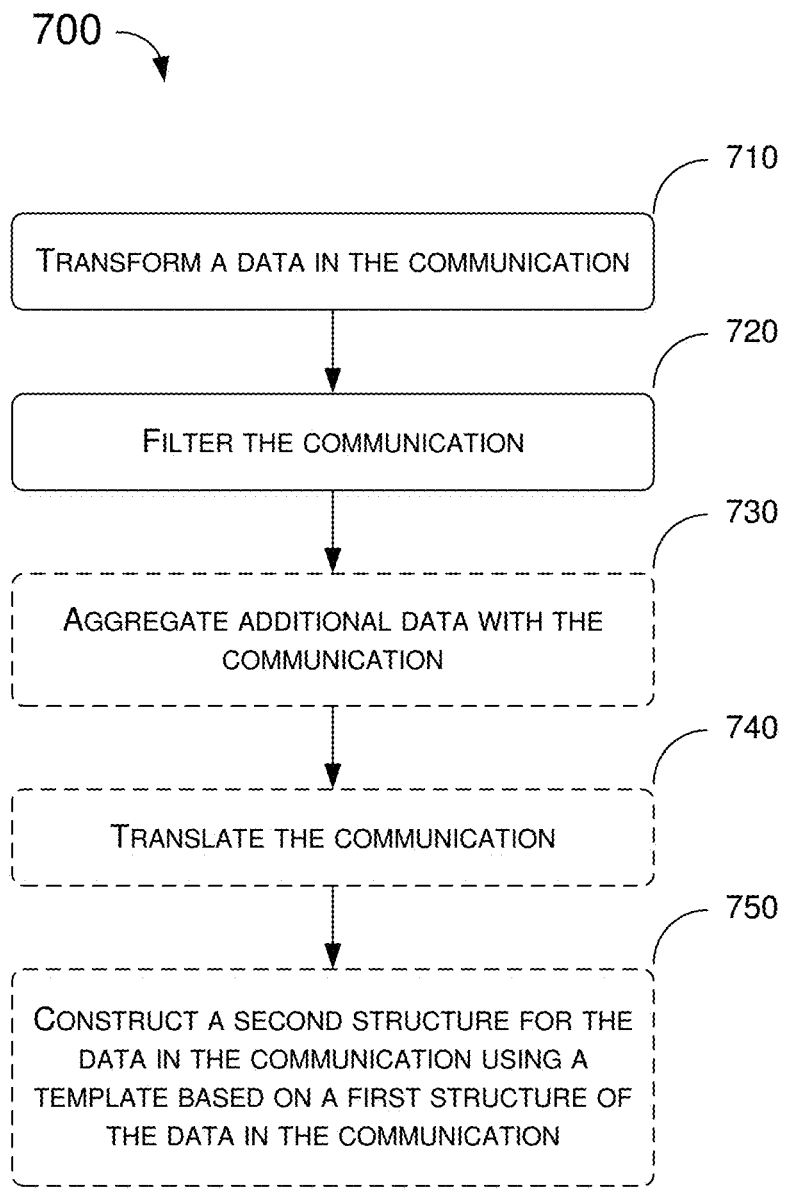
FIG. 7 is a flowchart diagram of an example process related to a template driven element adapter in accordance with another embodiment of the present disclosure.

FIG. 7 is a flowchart diagram of an example process 700 related to a template driven element adapter in accordance with an embodiment of the present disclosure. Example process 700 includes one or more operations, actions, or functions. Although illustrated as discrete blocks, various blocks may be divided into additional blocks, combined into fewer blocks, or eliminated, depending on the desired implementation. Example process 700 may be implemented by one or more processors equipped in, for example, server 120 and apparatus 500. For illustrative purposes, the operations described below are performed by one or more processors of server 120 as shown in FIG. 1 and/or processor 520 of apparatus 500 as shown in FIG. 5. As operations 730, 740 and 750 may be optional and not necessary, they are shown in dashed lines.

At 710, one or more processors of server 120 may transform data contained in a communication between a user, e.g., user 115 via user device 110, and a networked device of a network of a plurality of networked devices, e.g., any of networked devices 140(1), 140(2), 140(3), 140(4), 150(1), 150(2), 160(1), 160(2), 170(1), 170(2), 180(1), 180(2) and 180(3) of network 130. The communication may be, for example, a command from the user to the networked device.

At 720, the one or more processors of server 120 may filter the communication.

At 730, the one or more processors of server 120 may optionally aggregate additional data with the communication.

At 740, the one or more processors of server 120 may optionally translate the communication.

At 750, the one or more processors of server 120 may optionally construct a second structure for the data in the communication using a template based on a first structure of the data in the communication.

In at least some embodiments, the first structure of the data in the communication may be the JSON structure as described herein.

In at least some embodiments, in transforming the data in the communication, the one or more processors of server 120 may identify the data in the communication, and replace a first value of the data with a second value different from the first value.

In at least some embodiments, in filtering the communication, the one or more processors of server 120 may identify a pattern within the data in the communication, and determine whether or not to send the communication to a subsequent pipeline.

In at least some embodiments, in optionally aggregating additional data with the communication, the one or more processors of server 120 may call one or more external commands, and determine whether or not to aggregate the additional data with the communication in response to the calling.

In at least some embodiments, in optionally translating the communication, the one or more processors of server 120 may determine whether or not to translate the communication and, in response to a determination to translate the communication, translate the communication to a format specific to the networked device.

In at least some embodiments, in optionally constructing a second structure for the data in the communication using a template based on a first structure of the data in the communication, the one or more processors of server 120 may determine whether or not to construct the second structure based on the first structure of the data in the communication and, in response to a determination that the first structure comprises a hierarchical tree, construct the second structure for the data in the communication using the template.

In at least some embodiments, example process 700 may also involve the one or more processors of server 120 constructing a format for the communication that allows the first structure to be translated for the networked device in an event that the communication is from the user.

In at least some embodiments, example process 700 may also involve the one or more processors of server 120 parsing the data in the communication into the first structure in an event that the communication is from the networked device.

Although the present disclosure is described in terms of certain specific embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

The invention claimed is:

1. A method, comprising:
   interfacing, by one or more processors of a computing device, between a user and a networked device of a network of a plurality of networked devices to render a communication between the user and the networked device; and
   processing, by the one or more processors, the communication between the user and the networked device by:
      transforming data contained in the communication utilizing a JavaScript Object Notation (JSON) structure which both describes how an action is to be invoked against the networked device from the user and how to parse one of a result and an output from the networked device to the user, wherein the transforming the data in the communication comprises identifying the data in the communication, and
   replacing a first value of the data with a second value different from the first value;
   filtering the communication; and
   performing one or more operations comprising:
      aggregating additional data with the communication;
      translating the communication; and
      constructing a second structure for the data in the communication using a template based on a first structure of the data in the communication.

2. The method of claim 1, wherein the first structure of the data in the communication comprises a JavaScript Object Notation (JSON) structure.

3. The method of claim 1, wherein the filtering the communication comprises:
   identifying a pattern within the data in the communication; and
   determining whether or not to send the communication to a subsequent pipeline.

4. The method of claim 1, wherein the aggregating additional data with the communication comprises:
   calling one or more external commands; and
   determining whether or not to aggregate the additional data with the communication in response to the calling.

5. The method of claim 1, wherein the translating the communication comprises:
   determining whether or not to translate the communication; and
   in response to a determination to translate the communication, translating the communication to a format specific to the networked device.

6. The method of claim 1, wherein the constructing the second structure for the data in the communication using the template based on the first structure of the data in the communication comprises:
   determining whether or not to construct the second structure based on the first structure of the data in the communication; and
   in response to a determination that the first structure comprises a hierarchical tree, constructing the second structure for the data in the communication using the template.

7. The method of claim 1, further comprising:
   constructing a format for the communication that allows the first structure to be translated for the networked device in an event that the communication is from the user.

8. The method of claim 1, further comprising:
   parsing the data in the communication into the first structure in an event that the communication is from the networked device.

9. One or more computer-readable media storing a computer-executable instruction that, when executed by one or more processors, causes the one or more processors to perform operations comprising:
   transforming data contained in a communication between a user and a networked device of a network of a plurality of networked devices utilizing a JavaScript Object Notation (JSON) structure which both describes how an action is to be invoked against the networked device from the user and how to parse one of a result and an output from the networked device to the user, wherein the transforming the data in the communication comprises identifying the data in the communication, and replacing a first value of the data with a second value different from the first value;

filtering the communication; and performing one or more of the following:
aggregating additional data with the communication;
translating the communication; and
constructing a second structure for the data in the communication using a template based on a first structure of the data in the communication.

10. The one or more computer-readable media of claim 9, wherein the first structure of the data in the communication comprises a JavaScript Object Notation (JSON) structure.

11. The one or more computer-readable media of claim 9, wherein the filtering the communication comprises:
identifying a pattern within the data in the communication; and determining whether or not to send the communication to a subsequent pipeline.

12. The one or more computer-readable media of claim 9, wherein the aggregating additional data with the communication comprises:
calling one or more external commands; and
determining whether or not to aggregate the additional data with the communication in response to the calling.

13. The one or more computer-readable media of claim 9, wherein the translating the communication comprises:
determining whether or not to translate the communication; and
in response to a determination to translate the communication, translating the communication to a format specific to the networked device.

14. The one or more computer-readable media of claim 9, wherein the constructing a second structure for the data in the communication using a template based on a first structure of the data in the communication comprises:
determining whether or not to construct the second structure based on the first structure of the data in the communication; and
in response to a determination that the first structure comprises a hierarchical tree, constructing the second structure for the data in the communication using the template.

15. The one or more computer-readable media of claim 9, wherein the operations further comprise:
constructing a format for the communication that allows the first structure to be translated for the networked device in an event that the communication is from the user; and
parsing the data in the communication into the first structure in an event that the communication is from the networked device.

16. An apparatus interfacing a user and a plurality of networked devices of a network, comprising:
a common structure module configured to interface with the user, the common structure module containing one or more commands at a device level, one or more commands at a device-type level, and one or more commands at a device-family level;
a data transformation module communicatively coupled to the common structure module, the data transformation module configured to process data contained in a communication between the user and a networked device of the plurality of networked devices utilizing a JavaScript Object Notation (JSON) structure which both describes how an action is to be invoked against the networked device from the user and how to parse one of a result and an output from the networked device to the user, wherein the data transformation module is configured to process the data in the communication by performing operations comprising transforming the data in the communication by identifying the data in the communication, and replacing a first value of the data with a second value different from the first value;
a device-specific structure module communicatively coupled to the data transformation module, the device-specific structure containing one or more device-specific commands specific to the networked device; and
a device endpoint module communicatively coupled to the device-specific structure and configured to interface with one or more networked devices of the plurality of networked devices, the device endpoint module also configured to construct a format for the communication that allows a first structure of the data in the communication to be translated for the networked device in an event that the communication is from the user, the device endpoint module further configured to parse the data in the communication from a second structure into the first structure in an event that the communication is from the networked device.

17. The apparatus of claim 16, wherein the first structure of the data in the communication comprises a JavaScript Object Notation (JSON) structure.

18. The apparatus of claim 16, wherein the data transformation module is configured to process the data in the communication by performing operations comprising:
filtering the communication by:
identifying a pattern within the data in the communication; and
determining whether or not to send the communication to a subsequent pipeline;
aggregating additional data with the communication in response to a positive determination as a result of:
calling one or more external commands; and
determining whether or not to aggregate the additional data with the communication in response to the calling;
translating the communication by:
determining whether or not to translate the communication; and
in response to a determination to translate the communication, translating the communication to a format specific to the networked device; and
constructing a second structure for the data in the communication using a template based on the first structure of the data in the communication by:
determining whether or not to construct the second structure based on the first structure of the data in the communication; and
in response to a determination that the first structure comprises a hierarchical tree, constructing the second structure for the data in the communication using the template.

* * * * *